United States Patent [19]

Shiomi

[11] Patent Number: 5,748,993
[45] Date of Patent: May 5, 1998

[54] IMAGE STABILIZING DEVICE

[75] Inventor: Yasuhiko Shiomi, Kawaguchi, Japan

[73] Assignee: Canon Kabushiki Kaisha, Tokyo, Japan

[21] Appl. No.: 419,745

[22] Filed: Apr. 10, 1995

Related U.S. Application Data

[63] Continuation of Ser. No. 40,279, Mar. 30, 1993, abandoned.

[30] Foreign Application Priority Data

Apr. 6, 1992  [JP]  Japan .................. 4-112441

[51] Int. Cl.$^6$ .................................... B03B 17/00
[52] U.S. Cl. ............................... 396/52; 396/55
[58] Field of Search ......................... 354/400, 402, 354/403, 406, 407, 408, 410, 70, 76, 202; 396/52, 55

[56] References Cited

U.S. PATENT DOCUMENTS

| | | | |
|---|---|---|---|
| 4,970,540 | 11/1990 | Vasey et al. | 354/202 |
| 4,996,545 | 2/1991 | Enomoto et al. | 354/70 |
| 5,095,198 | 3/1992 | Nakazawa et al. | 354/407 |
| 5,175,580 | 12/1992 | Shiomi | 354/410 |
| 5,198,856 | 3/1993 | Odaka et al. | 354/430 |
| 5,229,603 | 7/1993 | Shiomi | 250/231.1 |
| 5,245,378 | 9/1993 | Washisu | 354/410 |
| 5,266,981 | 11/1993 | Hamada et al. | 354/400 |

*Primary Examiner*—Russell E. Adams
*Attorney, Agent, or Firm*—Fitzpatrick, Cella, Harper & Scinto

[57] ABSTRACT

In an image stabilizing device or system of the kind having a shake detecting sensor which detects a shake of the device or system and is arranged to require a lapse of time before the sensor becomes capable of stably detecting the shake after the start of the sensor, and an image shake correcting member which performs an image shake correcting action according to the output of the shake detecting sensor, a control circuit is arranged to allow the image shake correcting member to commence its image shake correcting action according to the output of the shake detecting sensor after the lapse of a given period of time from the start of the operation of the shake detecting sensor, and a varying circuit is arranged to vary the given period of time. The length of waiting time necessary before the detecting sensor becomes capable of stably performing a shake detecting action is thus arranged to be variable according to the operating state of the device or system, so that an image stabilizing action can be accomplished as soon as possible.

17 Claims, 6 Drawing Sheets

FIG.3

ROM DATA

| K | M (K) |
|---|---|
| 0 | M (0) |
| ⌇ | ⌇ |
| n | M (n) |
| ⌇ | ⌇ |

F I G.5(a)
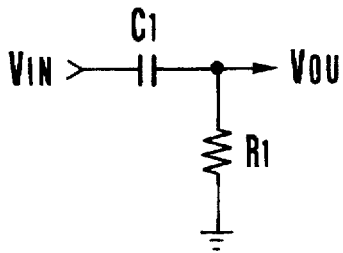
(T1: SAMPLING TIME)
F I G.5(b)
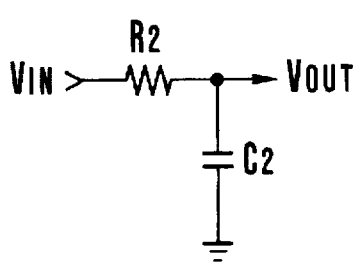
(T1: SAMPLING TIME)

IMAGE STABILIZING DEVICE

This application is a continuation of application Ser. No. 08/040,279 filed Mar. 30, 1993, now abandoned.

BACKGROUND OF THE INVENTION

1. Field of the Invention

This invention relates to an image stabilizing device adapted for an optical apparatus such as a camera or a video camera and equipped with, for example, shake detecting means such as an angular displacement sensor including a floating element, which is disposed within a liquid sealed in a case and is rotatable on a given rotation shaft, a yoke, which forms a closed magnetic circuit including the floating element, a winding coil interposed in between the floating element and the yoke, and optical means for optically detecting the relative angular displacement between the floating element and the case.

2. Description of the Related Art

An angular displacement sensor, which is arranged as shown in FIG. 6 of the accompanying drawings to operate by utilizing the inertia of a liquid has been used for an image stabilizing device of the kind mentioned above.

Referring to FIG. 6, the angular displacement sensor is arranged as follows: A cylindrical case 300 (hereinafter referred to as an outer cylinder) is filled with a liquid. A floating element 301 is arranged within the liquid to be rotatable relative to a rotation shaft 302. The floating element 301 is made of a permanent magnet so as to form a closed magnetic path in conjunction with a yoke 303. In the closed magnetic path is disposed a winding coil 304 which is provided for control over the sensor. A light emitting element 305 (hereinafter referred to as iRED) and a semi-conductor position detector 306 (hereinafter referred to as PSD) which are provided for optically detecting the movement of the floating element 301 relative to the outer cylinder 300 are arranged to be movable together with the outer cylinder 300.

For improving the low-frequency characteristic of this angular displacement sensor, a spring force obtainable by applying a current to the winding coil 304 on the basis of the output of the optical detecting means formed by the iRED 305 and the PSD 306 is set at a very weak force. Therefore, a mechanical unbalance resulting from a difference in specific gravity between the liquid and the floating element 301 brings about a large steady-state error under the influence of gravitation. If this steady-state error becomes extremely large, light emitted from the iRED 305 and reflected by the floating element 301 greatly deviates from the PSD 306 to make it hardly possible to detect any angular displacement.

To avoid this, an initial setting action on the angular displacement sensor is generally carried out as follows: The spring constant of a spring force obtainable by the optical detecting means and the winding coil 304 is arranged to be at an increased value for a given period of time to bring the floating element 301 to a datum point of the outer cylinder 300 and, then, to bring the spring constant back to its original value. At the same time, the balance level of the spring force obtained at that time is set as a DC offset value.

However, the conventional angular displacement sensor presents the following problem: In a case where a gravitational unbalance portion is to be obtained from the spring force in the state of having an increased spring constant, in order to cancel a shake portion due to a shake of the camera caused by the photographer, it is necessary to compute the balance level of the spring force by setting a low-pass filter of a long time constant which is long enough for the spring force to be detected and then to set the balance level as an offset value. If not, the value of a DC current which is necessary for removal of the actual mechanical unbalance of the angular displacement sensor would be caused to greatly deviate by a camera shake.

Therefore, the use of the low-pass filter having such a long time constant necessitates an extremely long period of time before bringing the angular displacement sensor into a normal operating state.

SUMMARY OF THE INVENTION

One aspect of this invention resides in the provision of an image stabilizing device or system which is adapted for an optical apparatus such as a camera or a video camera and is arranged to be capable of solving the above-stated problem of the prior art by varying a period of stable-state waiting time of shake detecting means according to the operating state of the device or system or the camera in such a way as to allow its image stabilizing action to commence as soon as possible. The image stabilizing device or system which is thus arranged in accordance with this invention comprises shake detecting means for detecting a shake applied to the device or the system, the shake detecting means being arranged to require a lapse of time before becoming capable of stably detecting the shake after starting its operation, image shake correcting means for performing an image shake correcting action according to an output of the shake detecting means, control means for allowing the image shake correcting means to commence the image shake correcting action according to the output of the shake detecting means after the lapse of a predetermined period of time from the start of the shake detecting means, and varying means for varying the predetermined period of time.

Another aspect of this invention resides in the provision of a shake detecting device which is arranged for an optical apparatus to vary a period of stable-state waiting time of shake detecting means according to the operating state of the optical apparatus in such a way as to start an image stabilizing action as soon as possible. To attain this purpose, a shake detecting device arranged for an optical apparatus according to this invention comprises shake detecting means for detecting a shake of the optical apparatus, time counting means for counting a predetermined period of time required before a detection output of the shake detecting means becomes stable, and varying means for varying the predetermined period of time.

These and other aspects and features of this invention will become apparent from the following detailed description of an embodiment thereof taken in connection with the accompanying drawings.

BRIEF DESCRIPTION OF THE DRAWINGS

FIG. 3 shows ROM data provided within the CPU.

FIGS. 5(a) and 5(b) supplement the description of the CPU operation shown in FIG. 2.

DETAILED DESCRIPTION OF THE PREFERRED EMBODIMENT

Figure 1:
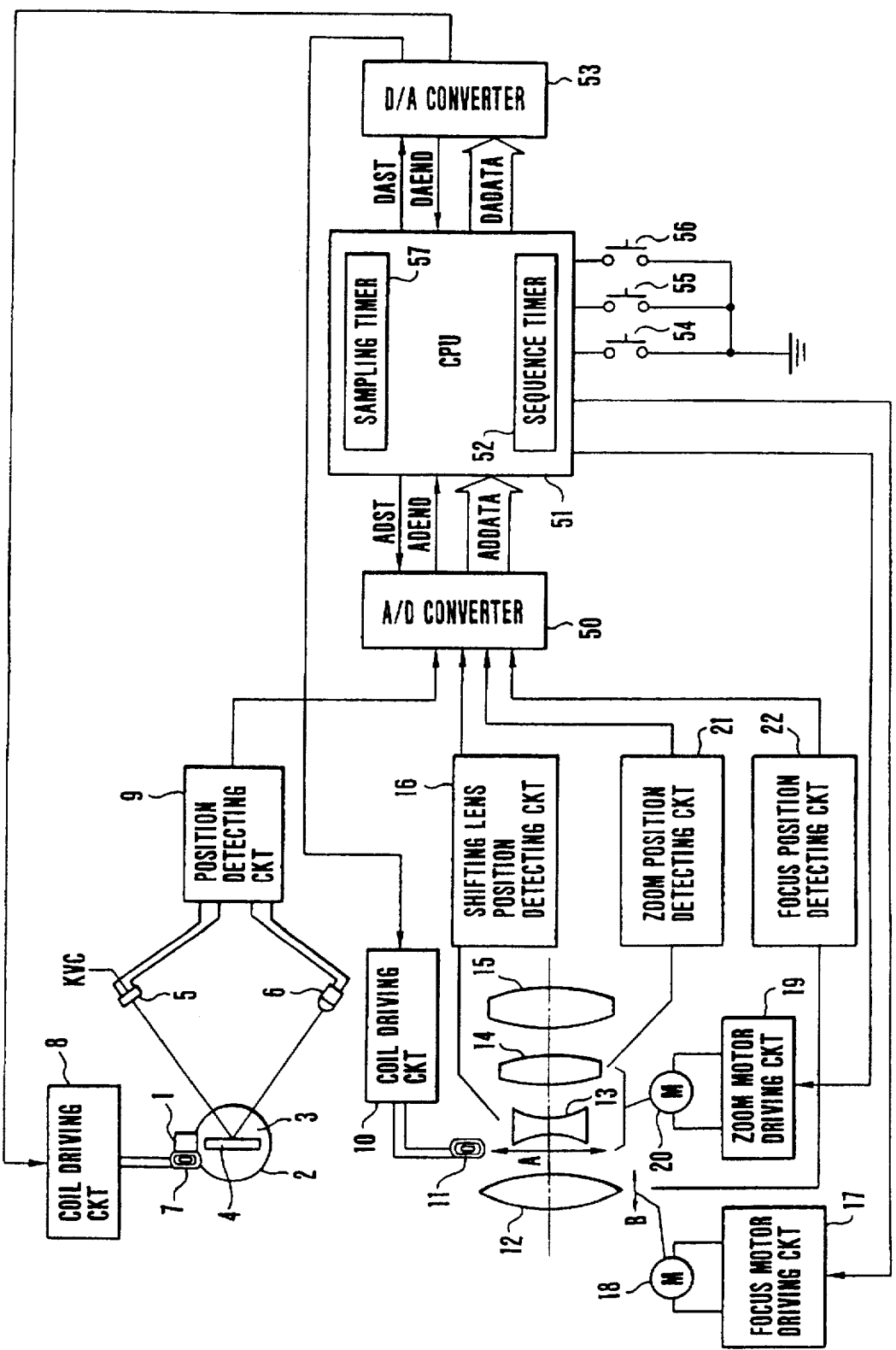
FIG. 1 is a circuit diagram showing the circuit arrangement of an image stabilizing device arranged for a camera as an embodiment of this invention.

FIG. 1 shows the circuit arrangement of an image stabilizing device for a camera arranged as an embodiment of this invention. Referring to FIG. 1, an angular displacement of a floating element 4 relative to an outer cylinder 2 is arranged to be detected by a PSD 5 and an iRED 6. The output of the PSD 5 is processed by a position detecting circuit 9 into a voltage output which corresponds to the relative angular displacement mentioned above. The voltage output is inputted to an A/D converter 50. A winding coil 7 is disposed within a closed magnetic circuit formed by the floating element 4 and a yoke 1 and is arranged to be driven by a coil driving circuit 8.

A photo-taking lens consists of a first lens group 12, a second lens group 13, a third lens group 14, and a fourth lens group 15. Within the photo-taking lens, a zooming lens consists of the second lens group 13 and the third lens group 14. In the zooming lens, the second lens group 13 is arranged to be movable in the directions of axes x and y within a plane which is perpendicular to the optical axis of the photo-taking lens. The second lens group 13 is thus arranged to serve as a known shifting lens. A camera shake correcting action is performed on the photo-taking lens with the second lens group 13 driven by means of a coil driving circuit 10 and a coil 11.

The absolute position of the second lens group 13, i.e., a shifting lens, is detected by a shifting lens position detecting circuit 16. The result of detection is inputted to the A/D converter 50. A zoom motor driving circuit 19 and a motor 20 are arranged to drive the second lens group 13 and the third lens group 14 for zooming. The absolute position of the zooming lens is detected by a zoom position detecting circuit 21. The result of the zoom position detection is inputted to the A/D converter 50.

The first lens group 12 is arranged to be driven for focusing by a focus motor driving circuit 17 and a motor 18. The absolute position of the focusing lens group 12 is detected by a focus position detecting circuit 22. The result of detection of focusing position is inputted from the focus position detecting circuit 22 to the A/D converter 50.

As mentioned above, the outputs of the angular-displacement-sensor position detecting circuit 9, the shifting lens position detecting circuit 16, the zoom position detecting circuit 21 and the focus position detecting circuit 22 are arranged to be inputted to the A/D converter 50 to be converted into digital data. Each digital data thus obtained is supplied to a CPU 51. The digital data is subjected to an applicable computing operation to be performed within the CPU 51. The result of the computing operation is supplied via a D/A converter 53 to the coil driving circuit 8 and the other coil driving circuit 10 as driving signals.

The operation of the image stabilizing device of the camera arranged as described above is described below with reference to FIGS. 2 and 4 which are flowcharts:

At steps 200 to 203, all coefficients to be used in carrying out differentiation by a digital operation are set in internal memories M (A0H), M (A1H) and M (B1H). Further, another memory M (WH) provided for storing a value which is computed at the time of previous sampling last carrier out and which is necessary for the digital operation is initialized to set its content at "0". The coefficients to be used in a case where a differentiating operation is to be digitally carried out are converted into a formula H (Z) on a plane Z according to a known S–Z conversion process (bilinear conversion in this case), on the basis of the frequency characteristic of a differentiating circuit shown in FIG. 5(a) and expressed as follows: H(S)=(SC1·R1)/(1+SC1·R1). The values of the coefficients of this formula H (Z) can be expressed by using a sampling time interval T1 as follows:

$$A0H = \frac{\frac{2}{T1}}{\frac{1}{C1 \cdot R1} + \frac{2}{T1}} \quad (1)$$

$$A1H = \frac{-\frac{2}{T1}}{\frac{1}{C1 \cdot R1} + \frac{2}{T1}} \quad (2)$$

$$B1H = \frac{\frac{1}{C1 \cdot R1} - \frac{2}{T1}}{\frac{1}{C1 \cdot R1} + \frac{2}{T1}} \quad (3)$$

At steps 204 to 207, coefficients to be used in carrying out a low-pass filter computing operation are set in internal memories M (A0L), M (A1L) and M (B1L). Further, a memory M (WL) for storing a value which is computed at the time of previous sampling last performed and which is necessary for the digital operation is initialized and set at "0". In a case where the low-pass filter data is to be digitally computed, the coefficients are converted to a formula H (Z) on a plane Z according to the S–Z conversion process on the basis of the frequency characteristic of a low-pass filter shown in FIG. 5(b) and expressed as follows: H(S)=1/(1+SC2·R2). The values of the coefficients of the formula H (Z) can be expressed by using the sampling time interval T1 as follows:

$$A0L = \frac{\frac{1}{C2 \cdot R2}}{\frac{1}{C2 \cdot R2} + \frac{2}{T1}} \quad (1)$$

$$A1L = \frac{\frac{1}{C2 \cdot R2}}{\frac{1}{C2 \cdot R2} + \frac{2}{T1}} \quad (2)$$

$$B1L = \frac{\frac{1}{C2 \cdot R2} - \frac{2}{T1}}{\frac{1}{C2 \cdot R2} + \frac{2}{T1}} \quad (3)$$

At a step 208, time data T1 is set at a sampling timer 57 which is provided for a digital computing operation on the output value of the angular displacement sensor at intervals of a given period of time T1. At a step 209, an interruption by the sampling timer 57 is allowed. At a step 210, the sampling timer 57 begins to operate. At a step 211, a sequence timer 52 which is provided for setting a period of time necessary for actually canceling a mechanical offset in the case of this embodiment is reset. At a next step 212, the sequence timer 52 is allowed to begin to operate.

At a step 213, a flag INITL is set within the CPU 51. At a step 214, the output of the zoom position detecting circuit 21 is converted into digital data in response to a signal ADST coming from the CPU 51. At a step 215, a check is made to find if the level of a signal ADEND has become a high level (H). If so, the flow of operation comes to a step 216. At the step 216, zoom position data thus obtained is set at a register Z which is input or disposed within the CPU 51.

Figure 2:
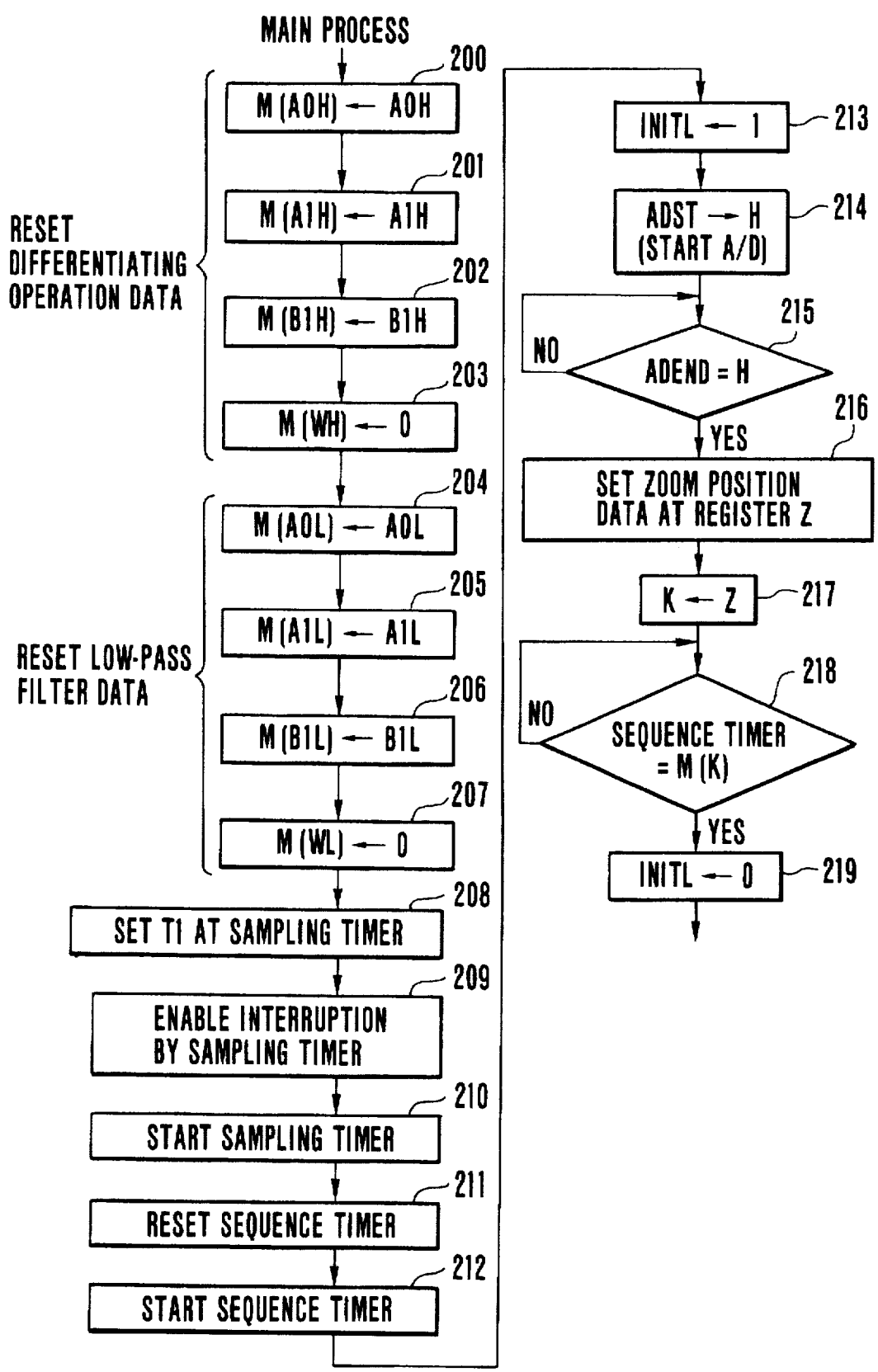
FIG. 2 is a flowchart showing the operation of a CPU included in the circuit arrangement of FIG. 1.
Figure 3:
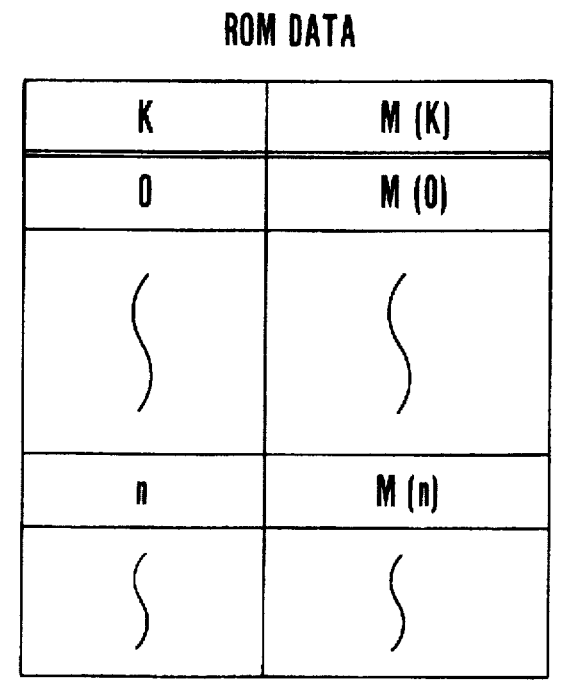
Figure 4:
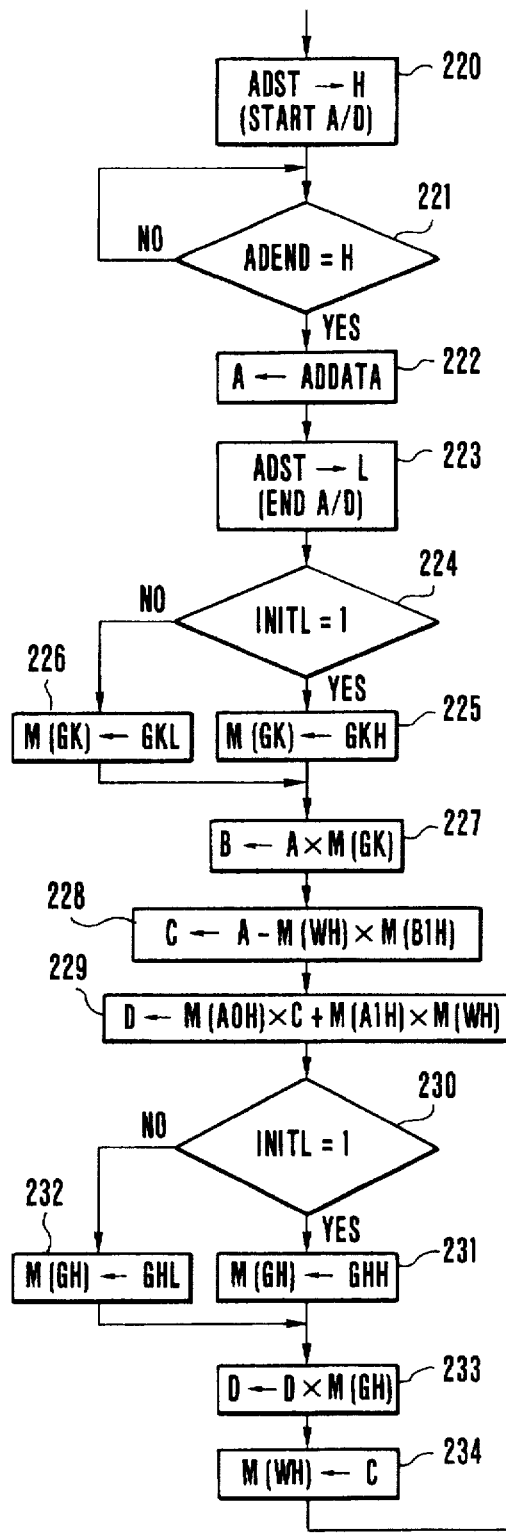
FIG. 4 is a flowchart showing the operation of the same CPU shown in FIG. 1.
Figure 4:
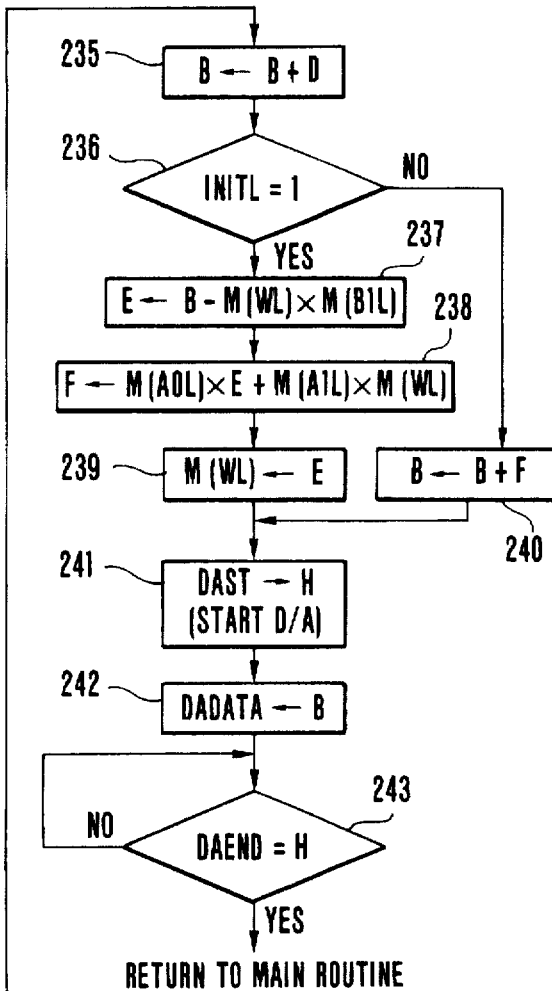
Figure 6:
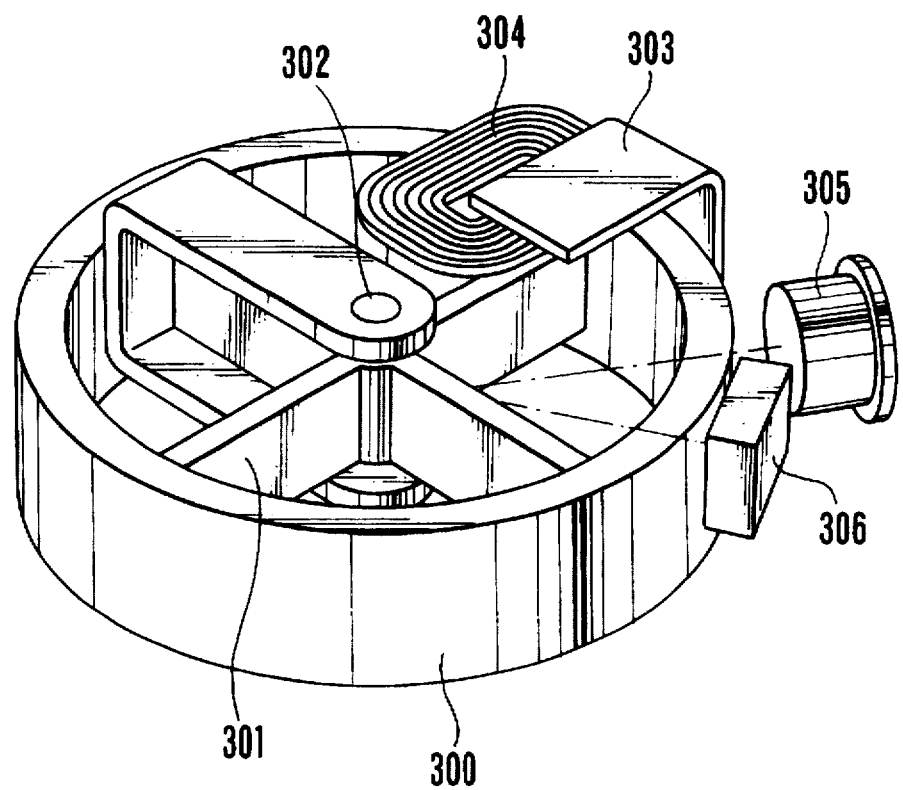
FIG. 6 is an oblique view showing an angular displacement sensor used for the image stabilizing device of the kind described.

Processes after a step 217 are executed for the purpose of obtaining data M (K) used for the sequence timer 52 corresponding to the zoom position from among data stored in a ROM arranged as shown in FIG. 3. At the step 217, the value of the internal register Z is first set at a memory address setting register K. At a step 218: The interruption by the sampling timer 57 is in process during a period before the timer value of the sequence timer 52 reaches the value of the data M (K). During this period, digital computing control is executed. This control operation is described below with reference to the flow chart of FIG. 4:

In the main routine of FIG. 2, the flow of operation comes to the interruption process to commence the operation shown in the flowchart of FIG. 4, as soon as the timer value of the sampling timer 57 reaches the given value T1. At a step 220 of FIG. 4, the level of the output signal ADST of the CPU 51 becomes high (H) to cause the A/D converter 50 to begin to A/D-convert the output of the angular displacement sensor. At a step 221, a check is made for the state of the signal ADEND which indicates the end of the A/D conversion. If the level of the signal ADEND is found to have become high, the flow of operation comes to a step 222. At the step 222, the result of the A/D conversion is set in an internal register A of the CPU. 51 via a bus ADDATA. At a next step 223, the process of A/D conversion comes to an end with the level of the output signal ADST becoming low (L). At a step 224, a check is made for the state of the flag INITL within the CPU 51. If the flag INITL is found to have been set at "1", the flow comes to a step 225 to set gain data GKH in a memory M (GK). If the flag INITL is found to have been reset at "0", the flow comes to a step 226 to set gain data GKL set in the memory M (GK). The value of the memory M (GK) is arranged to be used for determining the spring constant of the angular displacement sensor with a coil used for the sensor as mentioned in the foregoing. The value of the gain data GKH is arranged to be larger than the value of the other gain data GKL. At a step 227, the value of the register A and that of the memory M (GK) are multiplied by each other. The result of the multiplication is set in a register B.

Steps 228 to 234 are arranged to carry out a differentiating operation, i.e., a computing operation process for determining a viscous power of the angular displacement sensor obtained by the coil. At the step 228, the value of the memory M (WH) (at "0" immediately after the memory is reset) which has already been determined at the time of previous sampling and the value of the memory M (B1H) in which a constant value is set at the step 202 of FIG. 2 are multiplied by each other. After that, the result of the multiplication is subtracted from the value of the register A which is set at the output value of the angular displacement sensor. The result of the subtraction is set within a register C. At a next step 229, a product value obtained from the value of the memory M (WH) and the value of the memory M (A1H) which is set at a constant value at the step 201 is added to a product value obtained from the value of the register C and the memory M (A0H) which is set at a constant value at the step 200. The result of addition is set in a register D. At this point of time, the result of a differentiating operation digitally carried out on a difference signal of the angular displacement sensor has been set in the register D.

Next, at a step 230, a check is made for the state of the flag INITL within the CPU 51 in the same manner as at the step 224. If the flag INITL is found to have been set at "1", the flow comes to a step 231 to set gain data GHH in a memory M (GH). If the flag INITL is found to have been reset at "0", the flow comes to a step 232 to set gain data GHL in the memory M (GH). The value of the memory M (GH) is to be used for determining the viscosity constant of the angular displacement sensor. The gain data GHH has a larger value than the gain data GHL. At a step 233, the value of the register D obtained at the step 229 and that of the above-stated memory M (GH) are multiplied by each other. The result of multiplication is set again in the register D. At a step 234, the value of the register C which is necessary for the next sampling is set in the memory M (WH).

At a next step 235, the value of the register B in which a spring constant data corresponding to the spring force of the angular displacement sensor is set as mentioned above is added together with the value of the register D in which the viscosity constant data corresponding to the viscous power of the angular displacement sensor is set. The result of the addition is again set in the register B. At a step 236, the flag INITL is checked for its state. If the flag INITL is found to have been set at "1", the flow comes to a step 237. At steps 237 to 239, low-pass filter data for the register B is computed in the following manner:

At the step 237, the value of the memory M (WL) which has its value already set at the time of previous sampling (the value is "0" immediately after resetting) and the value of the memory M (B1L) in which a constant value is set at the step 206 of FIG. 2 are multiplied by each other. After that, the result of multiplication is subtracted from the value of the register B. The result of subtraction is set in a register E. At the step 238, a value obtained by multiplying by each other the value of the register E and the value of the memory M (A0L) which has been set at a constant value at the step 204 is added to a value obtained by multiplying by each other the value of the memory M (WL) and the value of the memory M (A1L) which has been set at a constant value at the step 205. The result of addition is set in a register F. At the step 239, the value of the register E which is necessary for the next sampling is set in the memory M (WL).

With the low-pass filter computing operation carried out by the steps 237 to 239 in the above-stated manner for spring constant data and viscosity constant data corresponding to the spring force and the viscous power mentioned in the foregoing, any adverse effect of the camera shake caused by the hand of the photographer is removed and DC data for canceling a mechanical unbalance of the angular displacement sensor is computed.

While the flag INITL is in the state of being set at "1", the level of an output signal DAST of the CPU 51 becomes high (H) at a step 241 after the low-pass filter computation. Then, at a step 242, the value of the register B is transferred via a bus DADATA to the D/A converter 53, so that a D/A conversion process begins. The output value of the D/A converter 53 becomes the value of a current to be applied to the winding coil 7 via the coil driving circuit 8. Therefore, the floating element 4 of the angular displacement sensor is caused to remain stationary in the neighborhood of its datum position by the strong spring force and the viscous power of the angular displacement sensor. The level of the output signal DAEND of the D/A converter 53 becomes high (H) upon completion of the D/A conversion process. At a step 243, when this high-level output of the D/A converter 53 is detected, the CPU 51 brings the timer interruption process to an end and the flow of operation comes back to the main process shown in FIG. 2.

The flag INITL remains set at "1" until the timer value of the sequence timer 52 reaches the data M (K). Therefore, until then, the actions described above are repeated every time the interruption by the sampling timer 57 takes place.

When the sequence timer 52 is found to have counted a given value M (K) at the step 218 of FIG. 2, the flag INITL is reset at "0" at the step 219. With the flag INITL in the state of being reset at "0", a weak spring constant and a weak viscosity constant are selected at the steps 226 and 232, respectively. Then, spring constant data and viscosity constant data obtained in the weak states come to be set in the register B at the step 235.

Next, since the flag INITL is found to be in the state of being reset at "0" at the step 236, the flow comes to a step 240. At the step 240, the value of the register F which stores a DC component for the value obtained by adding together the spring constant data and the viscosity constant data obtained when a strong spring constant and a strong viscosity constant are selected with the flag INITL set at "1" is added to the value of the register B. The result of addition is then set again at the register B. This value of the register B comes to be outputted from the D/A converter 53 through the steps 241, 242 and 243. The output of the D/A converter 53 becomes a current to be applied to the winding coil 7 via the coil driving circuit 8. In this instance, a DC current corresponding to the value of the above-stated register F is applied. Therefore, even if the spring force and the viscous power obtained by the coil are returned to normal values for the angular displacement sensor, the DC current brings about a reaction or a drag against a gravitational component resulting from a mechanical unbalance.

In the event of occurrence of an error due to an offset canceling method, the floating element in the angular displacement sensor moves as much as the amount of the error when the spring constant obtained as the spring force of the sensor is brought back to its original value. The adverse effect of this increases accordingly as the focal length of the photo-taking lens increases with the amount of this reduced to an image surface. Therefore, if the focal length of a zoom lens is short, a period of stable-state waiting time necessary for carrying out this offset canceling method can be shortened.

In view of this, the embodiment is arranged to detect information on zooming of the photo-taking lens of the camera at the beginning of an initial setting action on the angular displacement sensor, and then to vary the period of stable-state waiting time on the basis of the focal length information thus obtained at the time of initial setting (the actions performed at the steps 216 and 217 of FIG. 2). This arrangement enables the embodiment to shorten the build-up time of the angular displacement sensor especially at a short focal length of the photo-taking lens. In other words, a building up action on the angular displacement sensor can be carried out according to the operating state of the camera. The release time lag of the camera thus can be shortened by virtue of this arrangement.

As described in the foregoing, this embodiment is provided with varying means for varying a period of stable-state waiting time required before rendering the shake detecting means operable according to information obtained from focal length detecting means. Then, since the length of time required in canceling the amount of deflection of the camera body in relation to an absolute space varies with the focal length of the photo-taking lens, the period of table-state waiting time required before the shake detecting means becomes operable is changed according to the information from the focal length detecting means.

Therefore, with the period of stable-state waiting time of the shake detecting means changed according to the operating state of the camera, the release time lag of the camera can be shortened as much as possible.

In the case of this embodiment, displacement amount detecting means for directly detecting angular displacement caused by a shake is employed as the shake detecting means. However, this invention is applicable also to any cases where acceleration or angular acceleration detecting means or speed or angular speed detecting means is employed as the shake detecting means, as long as the lapse of time is required before the detecting means employed becomes capable of stably outputting its detection output after the start of operation thereof.

What is claimed is:

1. An apparatus for use in an image shake preventing device for preventing image shake, the image shake preventing device including an operation unit and an initializing unit for initializing the operation unit, said apparatus comprising:

an input device which inputs a predetermined signal; and a setting device which sets a parameter of an initializing operation by the initializing unit in accordance with the signal inputted by said input device.

2. An apparatus according to claim 1, wherein said setting device comprises means for varying a period of time for the initializing operation by the initializing unit in accordance with the signal inputted by said input device.

3. An apparatus according to claim 1, wherein said apparatus is usable with an optical device for forming an image and the operation unit detects an image shake of an image formed by the optical device, and wherein said input device comprises means for inputting a signal corresponding to a state of the optical device.

4. An apparatus according to claim 3, wherein the image shake preventing device is an optical apparatus.

5. An apparatus according to claim 1, wherein the operation unit comprises an image shake detecting unit for detecting image shake, wherein the initializing unit comprises image shake detecting unit initializing means for initializing the image shake detecting unit, and wherein said setting device comprises means for varying a parameter of the image shake detecting unit initializing means in accordance with the signal inputted by said input device.

6. An apparatus according to claim 1, wherein the operation unit comprises an image shake preventing unit comprising an image shake detecting unit for detecting image shake, said image shake preventing unit preventing image shake in accordance with an output of the image shake detecting unit, wherein the initializing unit comprises image shake preventing unit initializing means for performing an initialization of the image shake preventing unit, and wherein said setting device comprises means for varying an initialization operation of the image shake preventing unit initializing means in accordance with the signal inputted by said input device.

7. An apparatus according to claim 1, wherein said apparatus further comprises the image shake preventing device.

8. An apparatus according to claim 1, wherein said apparatus further comprises means for joining said apparatus with an optical device.

9. An apparatus for use in an image shake preventing device for preventing image shake, the image shake preventing device including an operation unit, said apparatus comprising:

an initializing unit for initializing the operation unit;

an input device which inputs a predetermined signal; and a setting device which sets a parameter of an initializing operation by said initializing unit in accordance with the signal inputted by said input device.

10. An apparatus according to claim 9, wherein said setting device comprises means for varying a period of time for the initializing operation by said initializing unit in accordance with the signal inputted by said input device.

11. An apparatus according to claim 9, wherein said apparatus is usable with an optical device for forming an image, wherein the operation unit detects an image shake of an image formed by the optical device, and wherein said input device comprises means for inputting a signal corresponding to a state of the optical device.

12. An apparatus according to claim 11, wherein the image shake preventing device is an optical apparatus.

13. An apparatus according to claim 9, wherein the operation unit comprises an image shake detecting unit for detecting image shake, wherein said initializing unit comprises image shake detecting unit initializing means for initializing the image shake detecting unit, and wherein said setting device comprises means for varying a parameter of the image shake detecting unit initializing means in accordance with the signal inputted by said input device.

14. An apparatus according to claim 9, wherein said apparatus further comprises the image shake preventing device.

15. An image shake prevention apparatus comprising:
   an image shake preventing device which operates for image shake prevention;
   an initializing unit for initializing said image shake preventing device;
   an input device which inputs a predetermined signal; and
   a setting device which sets a parameter of an initializing operation by said initializing unit in accordance with the signal inputted by said input device.

16. An optical apparatus usable with an image shake preventing device for preventing image shake, the image shake preventing device having an operation unit for preventing image shake and an initializing unit for initializing the operation unit, said apparatus comprising:
   an input device which inputs a predetermined signal; and
   a setting device which sets a parameter of an initializing operation by the initializing unit in accordance with the signal inputted by said input device.

17. A camera usable with an image shake preventing device for preventing image shake, the image shake preventing device having an operation unit for preventing image shake and an initializing unit for initializing the operation unit, said camera comprising:
   an input device which inputs a predetermined signal; and
   a setting device which sets a parameter of an initializing operation by the initializing unit in accordance with the signal inputted by said input device.

* * * * *

UNITED STATES PATENT AND TRADEMARK OFFICE
CERTIFICATE OF CORRECTION

PATENT NO. : 5,748,993

DATED : May 5, 1998

INVENTOR(S) : YASUHIKO SHIOMI

It is certified that error appears in the above-identified patent and that said Letters Patent is hereby corrected as shown below:

COLUMN 1:

Line 23, "liquid" should read --liquid,--; and
  Line 26, "follows:" should read --follows.--.

COLUMN 3:

Line 55, "flowcharts:" should read --flowcharts.--; and
  Line 61, "carrier" should read --carried--.

COLUMN 4:

Line 67, "218: The" should read --218. The--.

COLUMN 5:

Line 5, "FIG. 4:" should read --FIG. 4.--; and
  Line 18, "CPU. 51" should read --CPU 51--.

Signed and Sealed this

Eighth Day of December, 1998

Attest:

BRUCE LEHMAN

*Attesting Officer*     *Commissioner of Patents and Trademarks*